United States Patent
Koo et al.

(10) Patent No.: US 9,014,108 B2
(45) Date of Patent: Apr. 21, 2015

(54) METHOD FOR TRANSMITTING/RECEIVING A COMP REFERENCE SIGNAL

(75) Inventors: Ja Ho Koo, Anyang-si (KR); Seung Hee Han, Anyang-si (KR); Hyun Soo Ko, Anyang-si (KR); Jae Hoon Chung, Anyang-si (KR); Bin Chul Ihm, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 13/386,384

(22) PCT Filed: Jul. 26, 2010

(86) PCT No.: PCT/KR2010/004880
§ 371 (c)(1),
(2), (4) Date: Jan. 20, 2012

(87) PCT Pub. No.: WO2011/010904
PCT Pub. Date: Jan. 27, 2011

(65) Prior Publication Data
US 2012/0113951 A1 May 10, 2012

Related U.S. Application Data

(60) Provisional application No. 61/228,164, filed on Jul. 24, 2009.

(30) Foreign Application Priority Data

Dec. 9, 2009 (KR) .......................... 10-2009-0121788

(51) Int. Cl.
*H04L 5/00* (2006.01)
*H04W 72/00* (2009.01)
(Continued)

(52) U.S. Cl.
CPC .......... *H04L 25/0226* (2013.01); *H04L 5/0048* (2013.01); *H04L 27/2613* (2013.01)

(58) Field of Classification Search
USPC ........................ 370/300, 312, 329; 455/452.1
See application file for complete search history.

(56) References Cited

U.S. PATENT DOCUMENTS

| 7,940,740 B2 * | 5/2011 | Krishnamurthy et al. ..... 370/344 |
| 2010/0135273 A1 * | 6/2010 | Kim .............................. 370/344 |

(Continued)

FOREIGN PATENT DOCUMENTS

| JP | 2008-028977 | 2/2008 |
| JP | 2008-236430 | 10/2008 |

(Continued)

*Primary Examiner* — Andrew Chriss
*Assistant Examiner* — John Lequang
(74) *Attorney, Agent, or Firm* — McKenna Long & Aldridge LLP

(57) ABSTRACT

Disclosed is a method for transmitting a CoMP reference signal for accurate channel estimation. The CoMP reference signal is a cell-specific reference signal or a CoMP-zone-specific reference signal. A method for transmitting the cell-specific reference signal uses a CoMP set ID or does not apply a frequency shift value, or uses a serving cell ID or a frequency shift value of the serving cell. The cell-specific reference signal is transmitted using a preset resource region. A method for transmitting the CoMP-zone-specific reference signal is configured such that the pattern of the sequence of CoMP reference signals varies in each of the CoMP zones, and the pattern can be set in advance. The reference signal is multiplexed using an orthogonal code and transmitted to plural terminals using the same CoMP zone.

16 Claims, 5 Drawing Sheets

(51) Int. Cl.
*H04L 25/02* (2006.01)
*H04L 27/26* (2006.01)

(56) References Cited

U.S. PATENT DOCUMENTS

| | | | |
|---|---|---|---|
| 2010/0177746 A1* | 7/2010 | Gorokhov et al. | 370/336 |
| 2010/0285792 A1* | 11/2010 | Chen et al. | 455/422.1 |
| 2011/0038310 A1* | 2/2011 | Chmiel et al. | 370/328 |
| 2011/0098054 A1* | 4/2011 | Gorokhov et al. | 455/452.1 |
| 2011/0237270 A1* | 9/2011 | Noh et al. | 455/450 |
| 2012/0002740 A1* | 1/2012 | Han et al. | 375/260 |
| 2012/0087395 A1* | 4/2012 | Chmiel et al. | 375/211 |
| 2012/0329468 A1* | 12/2012 | Chmiel et al. | 455/450 |

FOREIGN PATENT DOCUMENTS

| | | |
|---|---|---|
| KR | 10-2008-0056423 | 6/2008 |
| WO | WO 2008/093716 | 8/2008 |

* cited by examiner

FIG. 4
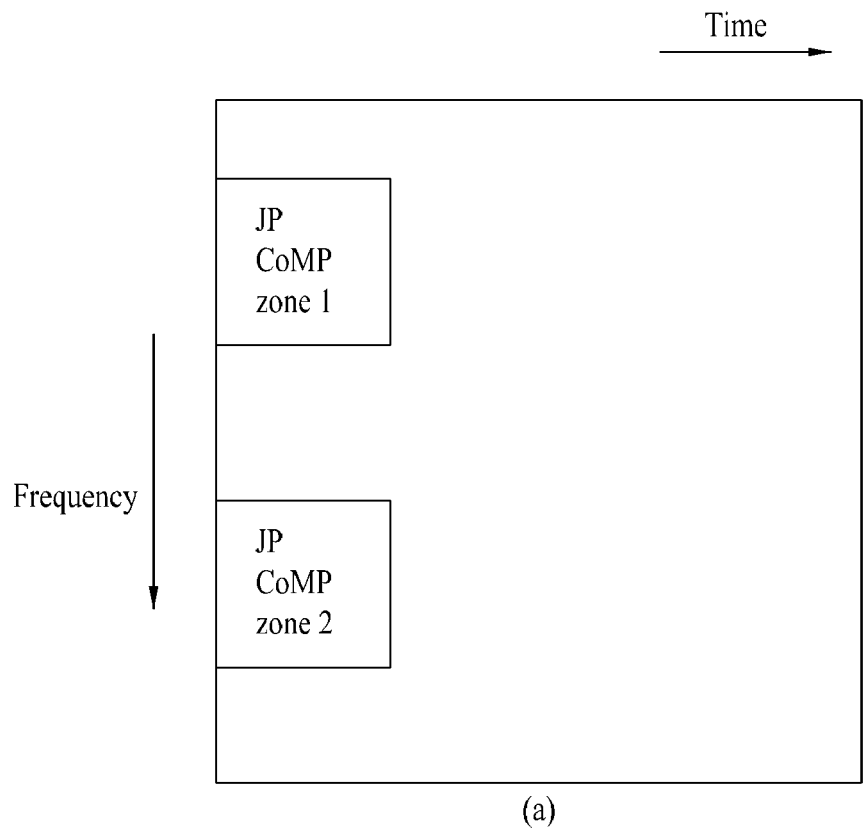
(a)
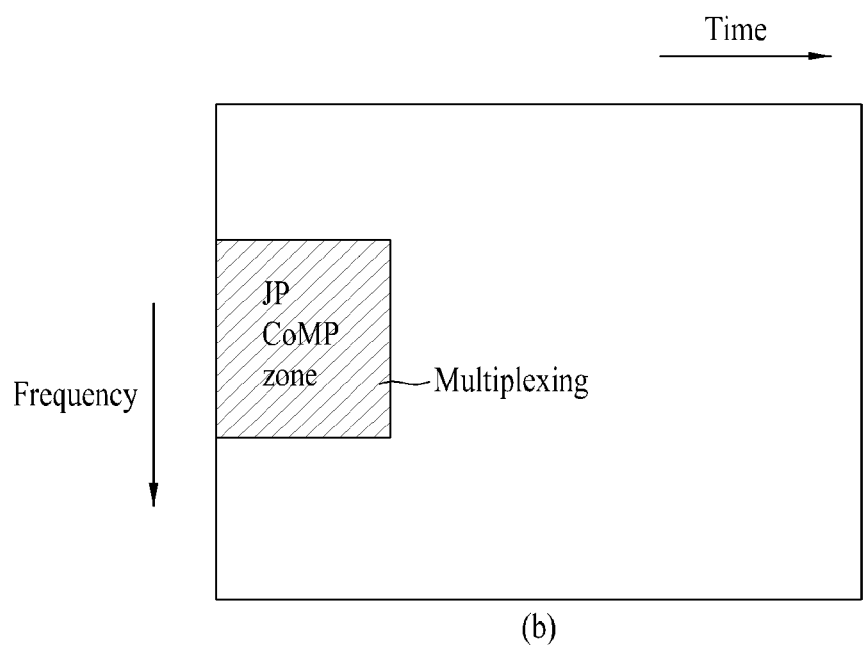
(b)

METHOD FOR TRANSMITTING/RECEIVING A COMP REFERENCE SIGNAL

CROSS-REFERENCE TO RELATED APPLICATIONS

This application is a 35 U.S.C. §371 National Stage entry of International Application No. PCT/KR2010/004880, filed on Jul. 26, 2010, and claims the benefit of priority of U.S. Provisional application No. 61/228,164 filed on Jul. 24, 2009, and Korean Patent application No. 10-2009-0121788 filed on Dec. 9, 2009, all of which are incorporated by reference in their entirety herein.

TECHNICAL FIELD

The present invention relates to a wireless communication system, and more particularly, to a method of transmitting and receiving CoMP reference signal in a wireless communication system.

BACKGROUND ART

Recently, MIMO (multiple input multiple output) system is one of the hottest segments in the wideband wireless communication technology. The MIMO system means the system that can raise communication efficiency of data using multiple antennas. And, the MIMO systems can be implemented using such MIMO scheme as spatial multiplexing scheme and spatial diversity scheme in accordance with a presence or non-presence of the same data transmission.

The spatial multiplexing scheme means the scheme for transmitting data at high speed by transmitting different data via a plurality of transmitting antennas simultaneously without increasing a bandwidth. The spatial diversity scheme means the scheme for obtaining transmission diversity by transmitting the same data via a plurality of transmitting antennas. Space time channel coding is an example for the space diversity scheme.

Moreover, the MIMO technique can be categorized into an open loop scheme and a closed loop scheme in accordance with a presence or non-presence of feedback of channel information to a transmitting side from a receiving side. The open loop scheme may include one of BLAST scheme of detecting a signal and increasing an information size amounting to the number of transmitting antennas in a manner that a transmitting side transmits information in parallel and that a receiving side detects a signal using ZF (zero forcing) and MMSE (minimum mean square error) scheme repeatedly, STTC (space-time trellis code) scheme of obtaining a transmission diversity and coding gain using a new space region, and the like. And, the closed loop scheme may include one of TxAA (transmit antenna array) scheme and the like.

In a radio channel configuration, a fading effect is generated in a manner that a channel status irregularly changes in time and frequency domains. In order to reconstruct data transmitted from a transmitter and find out a correct signal, a receiver corrects a received signal using channel information.

A wireless communication system transmits a signal known to a transmitter and a receiver both and then finds out channel information using an extent of the signal that is distorted on being transmitted on a channel. In this case, this signal is called a reference signal (or a pilot signal) and 'finding out channel information' is called channel estimation. The reference signal does not contain data actually and has high output. In case that data is transmitted or received using multiple antennas, it may be necessary to obtain a channel status between each transiting antenna and each receiving antenna. Hence, the reference signal exists for each transmitting antenna.

Coordinated MIMO system is proposed to reduce inter-cell interference in a multi-cell environment. If the coordinated MIMO system is used, a user equipment may be jointly supported with data in common by multiple base stations (multi-cell base-station). And, in order to improve performance of system, each base station may be able to support at least one user equipments (MS1, MS2, . . . , MSK) simultaneously using the same frequency resource. Moreover, the base station may be able to perform SDMA (space division multiple access) based on channel state information between the base station and the user equipment.

In the coordinated MIMO system, a serving base station and at least one or more cooperative base stations are connected to a scheduler via backbone network. The scheduler may be activated in a manner of receiving feedback of channel information on channel states between the cooperative base stations and the user equipments (MS1, MS2, . . . , MSK), which are measured by the base stations (BS1, BS2, . . . BSM) via the backbone network. For instance, information for the coordinated MIMO operation is scheduled for the serving base station and the at least one or more cooperative base stations by the scheduler. In particular, the scheduler directs instruction for the coordinated MIMO operation to each of the base stations.

CoMP has been proposed to reduce inter-cell interference and improve performance of a user equipment on a cell boundary in a multi-cell environment. Using CoMP system, a user equipment may be supported with data in common by a multi-cell base station. In particular, in a multi-cell environment, it may be able to improve communication performance of a user equipment using CoMP scheme. For this, accurate channel estimation is necessary based on a reference signal from the multi-cell base station.

Basically, cells of the related art generate reference signal sequences and patterns based on cell identifiers (IDs), respectively. However, in case of a coherent joint processing scheme capable of transmitting data simultaneously from multi-cell, this reference signal generation may cause degradation of communication performance.

DISCLOSURE OF THE INVENTION

Technical Tasks

An object of the present invention is to provide a method of transmitting and receiving CoMP reference signal.

Another object of the present invention is to provide a base station apparatus for transmitting CoMP reference signal.

A further object of the present invention is to provide a user equipment apparatus for receiving CoMP reference signal.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transmitting a CoMP (cooperative multi-point) reference signal at a base station, according to the present invention includes the steps of generating a CoMP reference signal sequence corresponding to a CoMP scheme of a CoMP set including cells operating by a CoMP scheme having the base station belong thereto, mapping the generated CoMP reference signal sequence to a specific resource region for the CoMP scheme, and transmitting the CoMP reference signal mapped to the specific resource region to a user equipment.

To further achieve these and other advantages and in accordance with the purpose of the present invention, a method of receiving a CoMP (cooperative multi-point) reference signal at a user equipment, according to the present invention includes the steps of receiving the CoMP reference signal corresponding to a specific CoMP scheme from each cell performing the CoMP scheme and identifiably processing the received CoMP reference signal per the each cell performing the CoMP operation or per CoMP set of cells performing the CoMP operation, wherein the CoMP reference signal is mapped to a specific resource region for the specific CoMP scheme.

To further achieve these and other advantages and in accordance with the purpose of the present invention, a method of transmitting a CoMP (cooperative multi-point) reference signal at a base station, according to the present invention includes the steps of allocating a specific resource region to transmit the CoMP reference signal, generating a CoMP reference signal sequence of a pattern equal to a CoMP reference signal sequence pattern previously set for the allocated resource region, mapping the generated CoMP reference signal sequence to the allocated resource region, and transmitting the mapped CoMP reference signal sequence to a user equipment.

To further achieve these and other advantages and in accordance with the purpose of the present invention, a base station apparatus for transmitting a CoMP (cooperative multi-point) reference signal according to the present invention includes a sequence generating module generating a CoMP reference signal sequence corresponding to a CoMP scheme of a CoMP set of cells operating by a CoMP scheme having the base station apparatus belong thereto, a resource mapper mapping the generated CoMP reference signal sequence to a specific resource region for the CoMP scheme, and a transmitter transmitting the CoMP reference signal mapped to the specific resource region to a user equipment.

To further achieve these and other advantages and in accordance with the purpose of the present invention, a user equipment apparatus for receiving a CoMP (cooperative multi-point) reference signal according to the present invention includes a receiver receiving the CoMP reference signal corresponding to a specific CoMP scheme from each cell performing the CoMP scheme and a processor identifiably processing the received CoMP reference signal per the each cell performing the CoMP operation or per CoMP set of cells performing the CoMP operation, wherein the CoMP reference signal is mapped to a specific resource region for the specific CoMP scheme.

Advantageous Effects

In case that a user equipment receives CoMP reference signal of the present invention, influence of inter-cell interference is considerably reduced and accurate channel estimation from multiple base stations is possible.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram for one example of a specific resource region for generation and transmission of CoMP reference signal.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Informations transmitted or received by the user equipment may include various kinds of data and control informations. In accordance with types and usages of the informations transmitted or received by the user equipment, various physical channels may exist.

Figure 1:
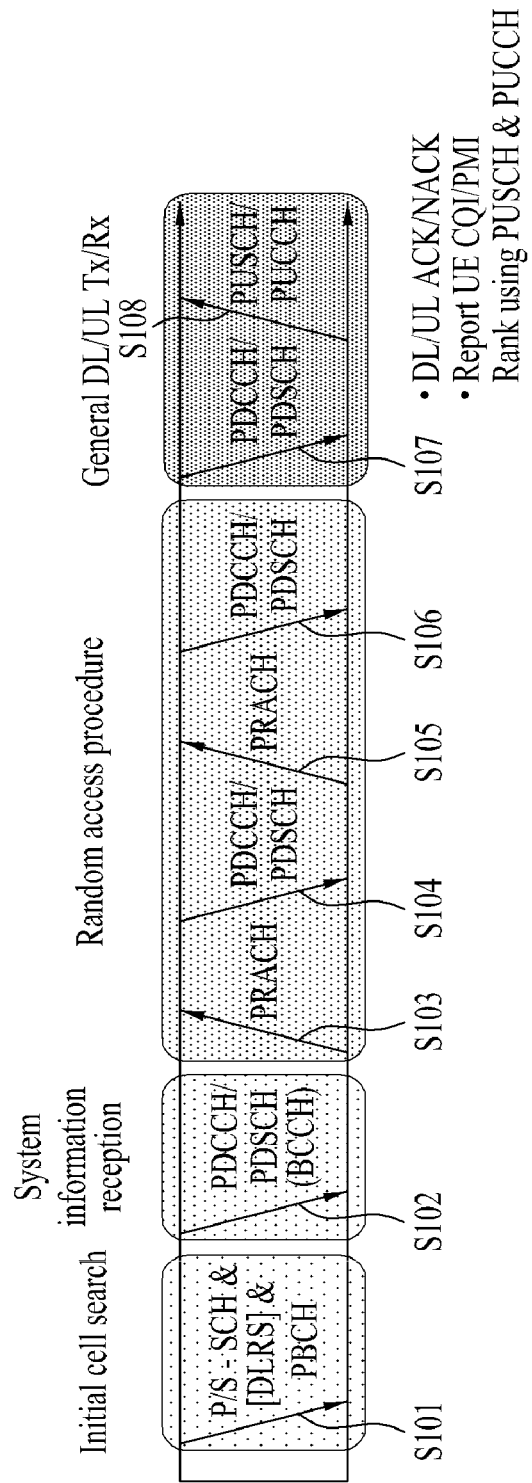
FIG. 1 is a diagram for explaining physical channels used for such a mobile communication system as 3GPP ($3^{rd}$ generation partnership project) LTE (long term evolution) system and a general signal transmitting method using the physical channels.

FIG. 1 is a diagram for explaining physical channels used for such a mobile communication system as 3GPP ($3^{rd}$ generation partnership project) LTE (long term evolution) system and a general signal transmitting method using the physical channels.

Referring to FIG. 1, a user equipment performs initial cell search such as synchronizing with a base station when it newly enters a cell or the power is turned on again (S101). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment receives a downlink reference signal in the initial cell searching step and may be then able to check a downlink channel state.

Having finished the initial cell search, the user equipment may acquire further detailed system information by receiving a physical downlink control channel (PDCCH) and a physical downlink shared channel (PDSCH) in accordance with the physical downlink control channel information (S102).

Meanwhile, if the user equipment initially accesses the base station or there is no radio resource for signal transmission, the user equipment may perform a random access procedure on the base station (S103 to S106). To this end, the user equipment transmits a specific sequence as a preamble on a physical random access channel (PRACH) (S103) and may then receive a response message to the random access through the PDCCH and the PDSCH corresponding to the PDCCH (S104). In case of a contention based random access except a case of handover, such a contention resolution procedure as a physical random access channel transmission S105 and a PDCCH/PDSCH reception S106 may be performed additionally.

Having performed the aforementioned steps, the user equipment may perform such a general UL/DL signal transmitting step as a PDCCH/PDSCH reception (S107) and a PUSCH/PUCCH (physical uplink shared channel/physical uplink control channel) transmission (S108). In this case, the control information transmitted from the user equipment to the base station or received from the base station by the user equipment in uplink may include DL/UL (downlink/uplink) ACK/NACK signals, a channel quality indicator (hereinafter abbreviated CQI), a precoding matrix index (hereinafter abbreviated PMI), a rank indicator (hereinafter abbreviated RI) and the like. In case of the 3GPP LTE ($3^{rd}$ generation partnership project long term evolution) system, the user equipment can transmit control information such CQI, PMI, RI and the like on the PUSCH and/or the PUCCH.

Figure 2:
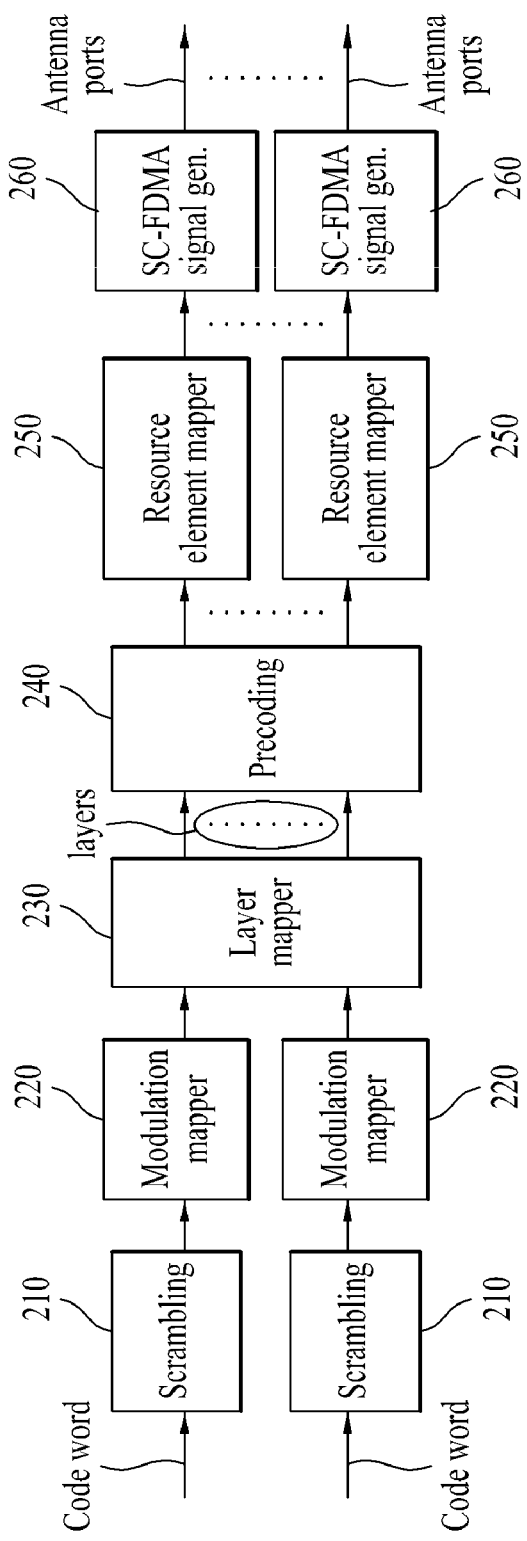
FIG. 2 is a diagram for describing a signal processing process for a base station to transmit a downlink signal in 3GPP LTE system for example of a mobile communication system.

FIG. 2 is a diagram for describing a signal processing process for a base station to transmit a downlink signal in 3GPP LTE system for example of a mobile communication system.

In 3GPP LTE system, a base station may be able to transmit at least one codewords in downlink. Hence, the at least one codeword may be processed into a complex symbol via a scrambling module 201 and a modulation mapper 202. Thereafter, the complex symbol is mapped to a plurality of layers by a layer mapper 203. And, each of the layers may be allocated to each transmitting antenna by being multiplied by a prescribed precoding matrix selected by a precoding module in accordance with a channel state. This processes transmitted signal per antenna is mapped to a time-frequency resource element by a resource element mapper 205 to be used for transmission and may be then transmitted via an OFDM signal generator 206 and a corresponding antenna.

Figure 3:
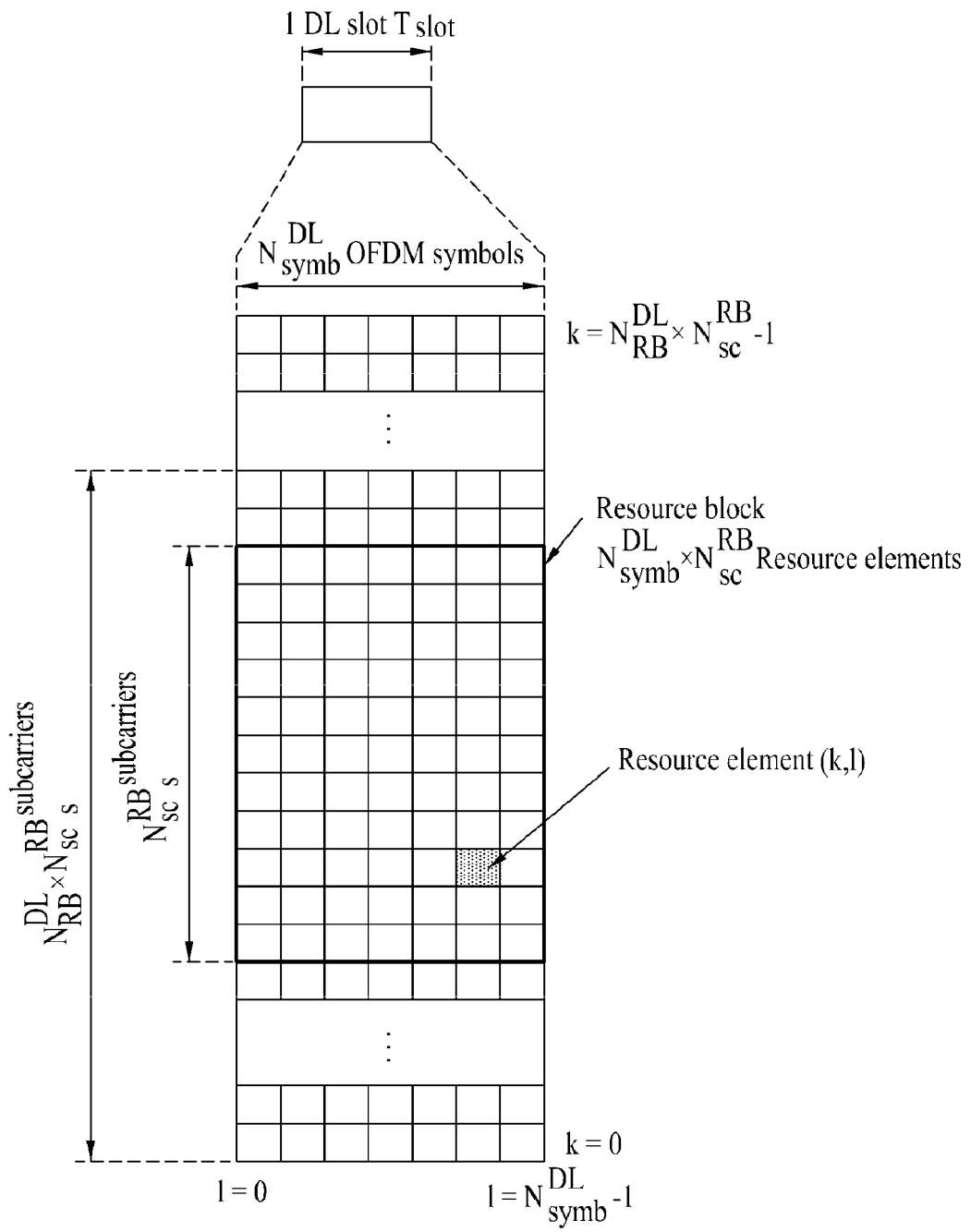
FIG. 3 is a diagram of a time-frequency resource grid structure used by the present invention.

FIG. 3 is a diagram of a downlink time-frequency resource grid structure used by the present invention.

A downlink (hereinafter abbreviated DL) signal transmitted in each slot uses a resource grid structure constructed with $N_{RB}^{DL} \times N_{SC}^{RB}$ subcarriers and $N_{symb}^{DL}$ OFDM (Orthogonal Frequency Division Multiplexing) symbols. In this case, '$N_{RB}^{DL}$' indicates the number of resource blocks (RBs) in DL, '$N_{SC}^{RB}$' indicates the number of subcarriers constructing one RB, and '$N_{symb}^{DL}$' indicates the number of OFDM symbols in one DL slot. A size of '$N_{RB}^{DL}$' varies in accordance with a DL transmission bandwidth configured within a cell and should meet '$N_{RB}^{min,DL} \leq N_{RB}^{DL} \leq N_{RB}^{max,DL}$'. In this case, '$N_{RB}^{min,DL}$' is a smallest DL bandwidth supported by a wireless communication system and '$N_{RB}^{max,DL}$' is a greatest DL bandwidth supported by the wireless communication system. It may become '$N_{RB}^{min,DL}$' and '$N_{RB}^{max,DL}=110$', by which the present example is non-limited. The number of the OFDM symbols included in one slot can vary in accordance with a length of a CP (cyclic prefix) and an interval of subcarrier. In caser of multi-antennal transmission, one resource grid can be defined for each antenna port.

Each element within the resource grid for each antenna port is called a resource element (hereinafter abbreviated RE) and is uniquely identified by an index pair (k, 1) within a slot. In this case, 'k' is an index in a frequency domain and '1' is an index in a time domain. The 'k' has a value selected from '0, . . . , $N_{RB}^{DL} N_{SC}^{RB}-1$' and the '1' has a value selected from '0, . . . , $N_{symb}^{DL}-1$'.

The resource block shown in FIG. 3 is used to describe the mapping relation between a prescribed physical channel and resource elements. Resource blocks can be classified into physical resource blocks (PRBs) and virtual resource blocks (VRBs). One PRB can be defined by $N_{symb}^{DL}$ contiguous OFDM symbols in time domain and $N_{SC}^{RB}$ contiguous subcarriers in frequency domain. In this case, '$N_{symb}^{DL}$' and '$N_{SC}^{RB}$' can be given as shown in Table 3. Hence, one PRB is constructed with '$N_{symb}^{DL} \times N_{SC}^{RB}$' resource elements. One PRB corresponds to one slot in time domain and also corresponds to 180 kHz in frequency domain, by which the present example is non-limited.

TABLE 1

| Configuration | | $N_{sc}^{RB}$ | $N_{symb}^{DL}$ |
|---|---|---|---|
| Normal | | | |
| cyclic prefix | Δf = 15 kHz | 12 | 7 |
| Extended | | | |
| cyclic prefix | Δf = 15 kHz | | 6 |
| | Δf = 7.5 kHz | 24 | 3 |

The terminology 'base station' used in the present invention is conceptionally used to include a cell or a sector. In case of being used as a regional concept, the terminology 'base station' may be named a cell or a sector. A serving base station (or cell) may be regarded as a base station (or cell) that provides a major service to a user equipment and may be able to perform transmission/reception of control information at a coordinated multiple transmission point. In this meaning, a serving base station (or cell) may be named an anchor base station (or anchor cell). A serving base station may be able to transmit various kinds of informations received from a user equipment to a neighbor base station (or cell). Likewise, in case that a neighbor base station is used as a regional concept, it may be called a neighbor cell. In the present invention, one CoMP set means a set of cells capable of performing CoMP operation. Cell belonging to CoMP set may switch its operation to enter non-CoMP mode in the course of performing CoMP operation.

If CoMP scheme is used in a multi-cell environment, it may be able to enhance communication performance of a user equipment on a cell boundary. This CoMP scheme may be categorized into JP (joint processing) of a coordinated MIMO type through data sharing, CS/CB (coordinated scheduling/beamforming) for reducing inter-cell interference like worst companion or best companion, geographically remote transport process (e.g., multi-antenna) scheme and the like.

Specifically, the CS/CB (coordinated scheduling/beamforming) scheme is the method of reducing inter-cell interference and may be able to reduce interference from a neighbor cell in a manner that a user equipment transmits a limited and/or recommended PMI to a serving base station. In this case, the worst companion scheme is a method for eliminating inter-cell interference in a manner that a user equipment reports PMI having a biggest interference with cells for CoMP operating cells to a serving base station and that the corresponding neighbor cells use a second-best PMI except the corresponding PMI. On the contrary, the best companion scheme is a method for reducing inter-cell interference in a manner that a user equipment reports PMI having a smallest interference with cells for CoMP operating cells and that the corresponding neighbor cells use the corresponding PMI.

Using the above-configured CoMP system, a user equipment may be supported with data jointly from multiple base stations (multi-cell base station). In particular, it may be able to improve communication performance of a user equipment on a cell boundary using the CoMP operation in a multi-cell environment.

Details of CoMP reference signal for LTE-A (long term evolution-advanced) system have not been defined yet. In general, reference signals for performing CoMP include a common reference signal (CRS) for the usage of channel state measurement of channel state information of multi-cell and the like and a demodulation reference signal (DRS) for the usage of demodulation.

DRS sequence usable for CoMP reference signal may be mapped within one resource block unlike CRS. Compared to CRS mapped across a whole region on a frequency axis, DRS may map a reference signal sequence by unit of physical resource block (PRB). For instance, DRS sequence having a length of 12 may be mapped within one resource block.

According to the present invention, first of all, a reference signal transmitting method using DRS in joint processing (JP) scheme among CoMP schemes in multi-cell environment is described. In particular, in order for multi-cell to transmit a desirable signal via a frequency resource region, the joint processing scheme using RF combining (or coherent) is described.

If multiple cells, which perform CoMP operation, transmit desirable signals to a user equipment located on a cell boundary of a serving cell using the same resource region (time/frequency region), it may be called a coherent or RF combining scheme. In order to use this RF combining scheme, it may be able to apply inter-cell MIMO scheme through inter-cell cooperation. This MIMO scheme may include one of transmit diversity (TxD) scheme such as single frequency network (SFN) transmission or space time block code (SFBC) for transmitting the same data between cells, spatial multiplexing (SM) scheme of higher layer, and the like.

In case that data is transmitted using a reference signal based on cell ID of cells differing from each other in coherent MIMO transmission between multi-cells, communication performance may be lowered. Data resource element and reference signal may collide with each other due to different reference signal sequences or patterns between multiple cells, which cause degradation of channel estimation performance of a user equipment. Moreover, different reference signals between multiple cells in applying such transmit diversity scheme as time space block code (SFBC) may break paring between data to obtain diversity gain.

In order to solve the problem of the coherent joint processing scheme according to using different reference signals between multiple cells, it may be able to maintain the same reference signal sequence and pattern of cells belonging to CoMP set that performs the coherent joint processing scheme. In particular, if multiple cells, which perform the CoMP operation, transmit the same reference signal sequence based on the same cell ID using the same resource region (time/frequency region), it may be able to basically solve the above problem.

In the following description, various embodiments of a method for multiple cells to generate CoMP reference signal sequence are described.

In a method of generating a CoMP reference signal sequence according to one embodiment of the present invention, assuming that a reference signal sequence r(m) is) mapped to a complex value modulation symbol $a_{k,l}^{(p)}$ using antenna part 5, it may be able to generate a CoMP reference signal sequence using Formula 1.

$$a_{k,l}^{(p)} = r(3 \cdot l' \cdot N_{RB}^{PDSCH} + m') \quad \text{[Formula 1]}$$

$$k = (k') \bmod N_{sc}^{RB} + N_{sc}^{RB} \cdot n_{PRB}$$

$$k' = \begin{cases} 4m' & \text{if } l \in \{2, 3\} \\ 4m' + 2\bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

In this case, except a cell-specific frequency shift equation '$v_{shift} = N_{ID}^{cell} \bmod 3$', a CoMP reference signal sequence is generated using Formula 1. A neighbor cell, which performs CoMP operation (e.g., coherent joint processing), generates a reference signal sequence based on DRS sequence and pattern of a serving cell and may be then able to transmit the generated reference signal sequence of the same pattern to a user equipment.

For example of a method of generating CoMP reference signal sequence according to one embodiment of the present invention, a CoMP set ID ($N_{ID}^{CoMPset}$) is set in advance and a reference signal sequence is then generated using Formula 2 based on the same CoMP set ID among CoMP set IDs previously set by a serving cell and neighbor cells, which perform CoMP.

$$k = (k') \bmod N_{sc}^{RB} + N_{sc}^{RB} \cdot n_{PRB} \quad \text{[Formula 2]}$$

-continued $$k' = \begin{cases} 4m' + v_{CoMP\_shift} & \text{if } l \in \{2, 3\} \\ 4m' + (2 + v_{CoMP\_shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

Neighbor cells may be able to transmit the reference signal sequence of the same pattern generated using Formula 2. In Formula 2, using the CoMP set-specific frequency shift '$v_{CoMP\_shift} = N_{ID}^{CoMP\ set} \bmod N$', it may be able to generate the same DRS sequence and pattern of cells belonging to a specific CoMP set.

As mentioned in the foregoing description, in order to smoothly perform the multi-cell based coherent joint processing scheme, a reference signal sequence between cells performing the CoMP operation is identically generated and may be then transmitted in the same pattern to a user equipment. In order to minimize the influence on a legacy user equipment by maintaining the advantage of the coherent joint processing scheme as maximal as possible, reference signal adaptation between CoMP scheme and non-CoMP scheme or between CoMP schemes is necessary. A cell belonging to one CoMP set in the course of performing an operation by a specific CoMP scheme may be able to switch it operation to enter a different CoMP scheme mode or a non-CoMP scheme mode.

In case that CoMP performing cells perform the coherent joint processing scheme, as mentioned in the foregoing description, the same reference signal sequence on the basis of the same ID is generated and then transmitted in the same pattern to a user equipment. On the other hand, if neighbor cells operate by the cooperative scheduling/beamforming (CS/CB) scheme or the non-CoMP scheme, it may be able to generate a reference signal sequence using Formula 3.

$$k = (k') \bmod N_{sc}^{RB} + N_{sc}^{RB} \cdot n_{PRB} \quad \text{[Formula 3]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

In order to perform CoMP operation efficiently and reduce feedback and scheduling overhead, it may be able to set a specific resource region (called 'CoMP' zone) for a specific CoMP scheme among resource regions. By setting a physical resource block (PRB) for CoMP operation, a CoMP performing user equipment may be able to perform measurement and feedback on CoMP zone. In accordance with this CoMP zone setting, it may be able to considerably reduce scheduling information between CoMP operation performing cells. This CoMP zone may be specifically further useful in case of a specific CoMP scheme (e.g., joint processing scheme) for CoMP cells to transmit a desirable signal to a user equipment in general.

Cells, which perform the coherent joint processing scheme, may be able to set the same CoMP zone on the same resource region (time/frequency region) for a user equipment located on a cell boundary. Thus, each of the cells, which perform the coherent joint processing scheme, generates a reference signal by one of the aforesaid CoMP reference signal generating methods using the previously set CoMP zone and may be then able to transmit the generated reference signal of the same pattern to a user equipment. And, a reference signal sequence is generated in the rest of the resource region except the CoMP zone based on a unique cell ID of each of the cells and may be then transmitted to the user equipment.

It may be necessary to define signaling to adaptively perform the mode switching between the above-described CoMP schemes or the mode switching between a specific CoMP scheme and a non-CoMP scheme.

First of all, cells, which perform the coherent joint processing scheme, may be able to generate the same reference signal using Formula 1 by excluding a different cell-specific frequency shift formula '$f_{shift} = N_{ID}^{cell} \bmod 3$'. In this case, a serving cell to which a user equipment located on a cell boundary belongs, may be able to turn off the generation of $V_{shift}$ value from a reference signal sequence currently generated by a corresponding cell ID by delivering an indication of the coherent joint processing scheme mode to neighbor cells that perform the CoMP operation. In doing so, in case that the CoMP performing cells transmit CoMP reference signal to perform the coherent joint processing scheme among the CoMP schemes using CoMP zone of a specific resource region specifically, the serving cell may be able to inform a user equipment and/or a neighbor cell of information on the CoMP zone region.

On the other hand, in order for neighbor cells to generate CoMP reference signal based on a cell ID of a serving cell and transmit the generated CoMP reference signal of the same pattern to a user equipment, the serving cell may deliver its cell ID information to a neighbor cell. In doing so, this indication information may be delivered via x2 interface, backhaul or the like. Alternatively, CoMP performing cells may be able to generate CoMP reference signal sequence to correspond to $V_{shift}$ value of the serving cell. In doing so, the CoMP reference signal sequence may be generated based on each cell ID. Likewise, in this case, when CoMP reference signal is transmitted using CoMP zone of a specific resource region specifically to perform the coherent joint processing scheme, the serving cell may be able to inform a user equipment and/or a neighbor cell of information on the CoMP zone region.

Meanwhile, in case that a coherent joint processing scheme is performed in a manner of setting CoMP set ID in advance, a user equipment or neighbor cells may receive information on a start of the coherent joint processing scheme, CoMP set ID information and the like from a serving cell. Moreover, when CoMP reference signal is transmitted using CoMP zone of a specific resource region specifically to perform the coherent joint processing scheme, the serving cell may be able to inform a user equipment and/or a neighbor cell of information on the CoMP zone region in advance.

Let's consider a situation that a plurality of user equipments simultaneously perform CoMP operation within one CoMP set among CoMP operations.

First of all, in case that multi-cells perform CoMP operation of transmitting a desirable signal for one user equipment only (e.g., multi-cell single user-MIMO (multi-cell SU-MIMO)), as mentioned in the foregoing description, in order for the multi-cells belonging thereto to generate the same CoMP reference signal, 1) a serving cell controls neighbor cells to turn off the generation of a frequency shift value $V_{shift}$, or 2) delivers its cell ID information to a neighbor cell to enable neighbor cells to generate CoMP reference signal sequence based on cell ID of the serving cell. Alternatively, 3) the serving cell controls CoMP performing cells to generate the same CoMP reference signal based on CoMP set ID previously defined to perform the coherent joint processing scheme and then to transmit the generated CoMP reference signal of the same pattern.

From now on, consider a situation that one base station performs a coherent joint processing scheme for a plurality of user equipments.

FIG. 4 is a diagram for one example of a specific resource region for generation and transmission of CoMP reference signal.

In case that multi-cells perform CoMP operation to transmit a desirable signal to at least one user equipment (e.g., multi-cell multi-user-MIMO (multi-cell MU-MIMO)), each user equipment may receive allocation of a different specific resource region (e.g., $1^{st}$ CoMP zone, $2^{nd}$ CoMP zone, etc.) or may be multiplexed with the same CoMP zone.

Referring to FIG. 4 (a), in case that each user equipment receives allocation of a different CoMP zone, each of multiple cells performing CoMP operation turns off $V_{shift}$ of each CoMP zone and then transmits CoMP reference signal, thereby efficiently performing the coherent joint processing scheme on the user equipment belonging to the corresponding CoMP zone. On the other hand, multi-cells with reference to specific cell ID among multi-cells in the course of performing CoMP operation generate the same CoMP reference signal and then transmit the generated same CoMP reference signal to a user equipment. Alternatively, in CoMP zone to which a corresponding user equipment belongs with reference to cell ID of a serving cell to which each user equipment belongs, all cells performing CoMP operation generate the same CoMP reference signal and may be then able to transmit the generated same CoMP reference signal to the user equipment. Besides, after CoMP set ID has been defined in advance, all cells performing CoMP operation generate and transmit the same CoMP reference signal to a user equipment based on the defined CoMP set ID.

Unlike the above-mentioned method of generating and transmitting the cell-specific CoMP reference signal sequence, CoMP zone-specific method of respectively generating and transmitting different CoMP reference signals for CoMP zones is proposed as follows.

First of all, multi-cells may be able to transmit CoMP reference signal based on CoMP reference signal sequence and pattern previously defined per CoMP zone currently serviced by the corresponding multi-cell. A serving cell having a user equipment belong thereto may inform another neighbor cell of CoMP reference signal information on the corresponding CoMP zone. Alternatively, after CoMP zone ID different per resource region corresponding to CoMP zone has been set in advance, each base station may generate and transmit a previously-agreed CoMP reference signal sequence according to the CoMP zone ID.

Referring to FIG. 4 (b), if each user equipment is multiplexed with the same CoMP zone, each cell performing CoMP operation may be able to transmit CoMP reference signal using the same CoMP zone based on orthogonal code resource. In this case, the code resource may include one of all orthogonal codes such as Walsh-Hadamard code, DFT (discrete Fourier transform) orthogonal code (circular shift) and the like. Each cell may deliver information indicating that CoMP reference signal is currently transmitted on a specific orthogonal code resource to each user equipment within the same CoMP zone. A basic CoMP reference signal sequence is generated based on the above-mentioned methods, and an orthogonal code resource may be usable for another user equipment within the same CoMP zone in addition.

Information (e.g., coherent joint processing scheme mode start information, CoMP set ID index, information on orthogonal code resource, etc.) for the aforesaid coherent joint processing scheme supposed to be delivered to a user equipment from a serving cell or the like may be named 'coherent joint processing scheme information'. This coherent joint processing scheme information may be delivered by higher layer signaling or L1/L2 control signaling.

A serving base station may be able to inform a user equipment of 'coherent joint processing scheme information'. This information may be transmitted to the user equipment periodically or at an event-triggered timing point. Meanwhile, the serving base station may be able to transmit information on 'coherent joint processing scheme information' to the user equipment by the L1/L2 control signaling.

Generally, a base station may be able to transmit scheduling allocation information and other control informations and the like on PDCCH. A physical control channel may be transmitted as one aggregation or a plurality of contiguous control channel elements (CCEs). One CCE may include 9 resource element groups. The number of resource element groups not allocated to PCFICH (physical control format indicator channel) or PHICH (physical hybrid automatic repeat request indicator channel) is $N_{REG}$. CCEs available for a system range 0 to $N_{CCE}-1$, where $N_{CCE}=\lfloor N_{REG}/9 \rfloor$. PDCCH supports such multi-format as shown in Table 2. One PDCCH constructed with n contiguous CCEs starts with CCE that performs 'i mod n=0', where i is CCE index). Multi-PDCCHs may be transmitted in one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, a base station may be able to determine a PDCCH format in accordance with how many regions will be used to carry control information and the like. And, a user equipment may be able to reduce overhead by reading the control information and the like by CCE unit. PDCCH of a DCI (downlink control information) format type configured in a format according to control information a serving station attempts to transmit may be designed identifiably. In this case, in viewpoint of reusing a previous DCI format, a DCI format may be configured in a manner of reusing some fields of a random DCI format and padding the rest of the fields with zero padding or arbitrary values. And, information on the configured DCI format may be transmitted to a user equipment.

For instance, assume that simple scheduling on rank 1 transmission of single codeword is transmitted in spatial multiplexing mode using DCI format 1B. Table 3 shows one example of downlink control information transmitted using DCI format 1B.

TABLE 3

| Information field | Bit(s) |
| --- | --- |
| Localized/distributed VRB assignment flag | 1 |
| Resource block allocation | $\lceil \log_2(N_{RB}^{DL})(N_{RB}^{DL}+1)/2 \rceil$ |
| Modulation & coding scheme (MCS) | 5 |
| # of HARQ processing | 3 (FDD), 4 (FDD) |
| New data indicator | 1 |
| Redundancy version | 2 |
| TPC command for PUCCH | 2 |
| Downlink assignment index | 2 |

Referring to Table 3, DCI format 1B includes a plurality of information fields. In particular, a plurality of the information fields may include a localized/distributed virtual resource block (VRB) assignment flag field, a resource block allocation field, a modulation and coding (MCS) scheme field, an HARQ processing number field, a new data indicator field, a TCP command field for PUCCH, a downlink assignment index field, a TPMI (transmitted precoding matrix indicator) information field for precoding, a PMI approval field for precoding, and the like.

This DCI format 1B may be configured as Table 4 to support a joint processing scheme among CoMP schemes.

TABLE 4

| Information field | Bit(s) |
| --- | --- |
| Localized/distributed VRB assignment flag | 1 |
| Resource block allocation | $\lceil \log_2(N_{RB}^{DL})(N_{RB}^{DL}+1)/2 \rceil$ |
| Modulation & coding scheme (MCS) | 5 |
| # of HARQ processing | 3 (FDD), 4 (FDD) |
| New data indicator | 1 |
| Redundancy version | 2 |
| TPC command for PUCCH | 2 |
| Downlink assignment index | 2 |
| Coherent joint processing information (e.g., coherent joint processing mode start information, CoMP set ID index, orthogonal code resource, etc.) | 5 |

Referring to Table 4, the bit number of each information field is just exemplary, b which a size of the information field may be non-limited. In order to provide commonality of downlink transmission irrespective of transmission mode, it may be able to transmit information having the same size of DCI format for single user MIMO (SU-MIMO), multi-user-MIMO (MU-MIMO) and the like.

Since a CoMP performing user equipment is based on a modulation reference signal from multi-cell, it may be able to delete information bits for PMI. And, 'coherent joint processing scheme information' may be carried on a space obtained from the deletion of information bits. Since the coherent joint processing scheme information is variable, it may be configured in a manner that some fields are used and that the rest of the fields are padded with zero padding or arbitrary values.

As mentioned in the above description, a cell-boundary user equipment considerably reduces inter-cell interference in a multi-cell environment in accordance with CoMP reference signal generating and transmitting methods according to the present invention and may perform accurate channel estimation from a multi-cell base station smoothly.

Figure 5:
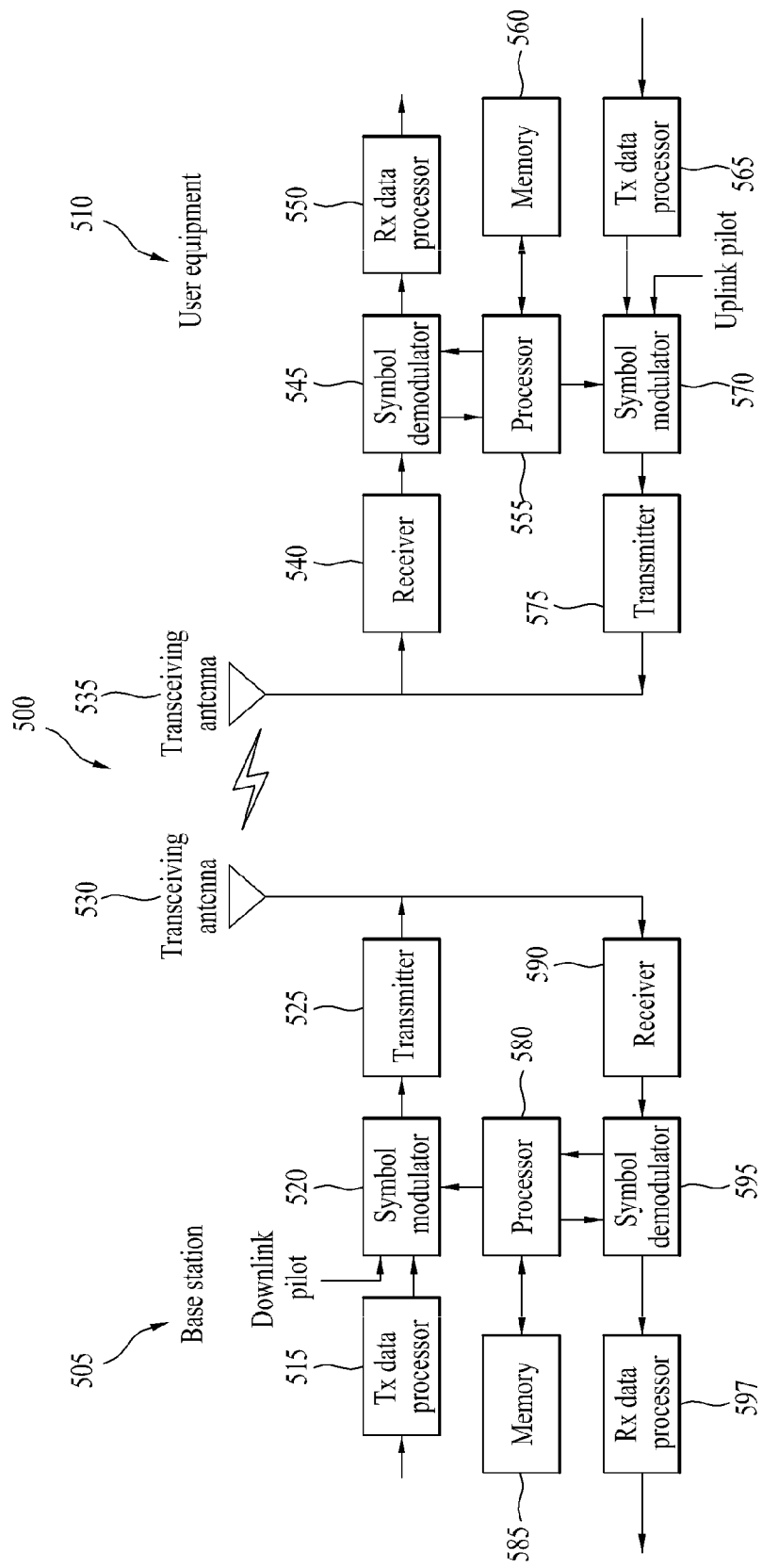
FIG. 5 is a block diagram for configurations of a base station t05 and a user equipment 510 in a wireless communication system according to the present invention.

FIG. 5 is a block diagram for configurations of a base station 505 and a user equipment 510 in a wireless communication system according to the present invention.

Although one base station 505 and one user equipment 510 are shown in the drawing to schematically represent a wireless communication system 500, the wireless communication system 500 may include at least one base station and/or at least one user equipment.

Referring to FIG. 5, a base station 505 may include a transmitted (Tx) data processor 515, a symbol modulator 520, a transmitter 525, a transceiving antenna 530, a processor 580, a memory 585, a receiver 590, a symbol demodulator 595 and a received data processor 597. A user equipment 510 may include a transmitted (Tx) data processor 565, a symbol modulator 570, a transmitter 575, a transceiving antenna 535, a processor 555, a memory 560, a receiver 540, a symbol demodulator 555 and a received data processor 550. Although the base station/user equipment 505/510 is configured to include one antenna 530/535 in the drawing, each of the base station 505 and the user equipment 510 may include multi-antenna having a plurality of antennas. Therefore, each of the base station 505 and the user equipment 510 supports MIMO (multiple input multiple output) system. And, the base station/user equipment 505/510 according to the present invention may support both SU-MIMO (single user-MIMO) and MU-MIMO (multi user-MIMO).

In downlink, the transmitted data processor 515 receives traffic data, codes the received traffic data by formatting the received traffic data, interleaves the coded traffic data, modulates (or symbol maps) the interleaved data, and then provides modulated symbols (data symbols). The symbol modulator 520 provides a stream of symbols by receiving and processing the data symbols and pilot symbols.

The symbol modulator 520 multiplexes the data and pilot symbols together and then transmits the multiplexed symbols to the transmitter 525. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 525 receives the stream of the symbols, converts the received stream to at least one or more analog signals, additionally adjusts the analog signals (e.g., amplification, filtering, frequency upconverting), and generates a downlink signal suitable for a transmission on a radio channel. Subsequently, the downlink signal is transmitted to the user equipment via the antenna 530.

The processor 580 of the base station 505 according to the present invention may include a sequence generating module (not shown in the drawing) and a resource mapper (not shown in the drawing). The sequence generating module may be able to generate CoMP reference signal sequence corresponding to CoMP scheme of CoMP set that is a set of cells operating by CoMP scheme to which the base station belongs to. The resource mapper may be able to map the generated CoMP reference signal sequence to a specific resource region for the CoMP scheme. And, the transmitter 525 may be able to transmit the CoMP reference signal mapped to the specific resource region to the user equipment.

In the configuration of the user equipment 510, the antenna 535 receives the downlink signal from the base station and then provides the received signal to the receiver 540. The receiver 540 adjusts the received signal (e.g., filtering, amplification and frequency downconverting), digitizes the adjusted signal, and then obtains samples. The symbol demodulator 545 demodulates the received pilot symbols and then provides them to the processor 555 for channel estimation.

The symbol demodulator 545 receives a frequency response estimated value for downlink from the processor 555, performs data demodulation on the received data symbols, obtains data symbol estimated values (i.e., estimated values of the transmitted data symbols), and then provides the data symbols estimated values to the received (Rx) data processor 550. The received data processor 550 reconstructs the transmitted traffic data by performing demodulation (i.e., symbol demapping, deinterleaving and decoding) on the data symbol estimated values.

The processing by the symbol demodulator 545 and the processing by the received data processor 550 are complementary to the processing by the symbol modulator 520 and the processing by the transmitted data processor 515 in the base station 505, respectively.

In the user equipment 510 in uplink, the transmitted data processor 565 processes the traffic data and then provides data symbols. The symbol modulator 570 receives the data symbols, multiplexes the received data symbols, performs modulation on the multiplexed symbols, and then provides a stream of the symbols to the transmitter 575. The transmitter 575 receives the stream of the symbols, processes the received stream, and generates an uplink signal. This uplink signal is then transmitted to the base station 505 via the antenna 135.

The receiver 540 of the user equipment 510 according to the present invention may be able to receive CoMP reference signal corresponding to the operating specific CoMP scheme from each cell that performs CoMP operation. The processor 555 of the user equipment 510 processes the CoMP reference signal received by the receiver 540 in a manner of sorting the received CoMP signal by each cell performing the CoMP operation or each CoMP set that is a set of the cells performing the CoMP operation. In doing so, the CoMP reference signal may be mapped to the specific resource region for the specific CoMP scheme.

In the base station 505, the uplink signal is received from the user equipment 510 via the antenna 530. The receiver 590 processes the received uplink signal and then obtains samples. Subsequently, the symbol demodulator 595 processes the samples and then provides pilot symbols received in uplink and a data symbol estimated value. The received data processor 597 processes the data symbol estimated value and then reconstructs the traffic data transmitted from the user equipment 510.

The processor 555/580 of the user equipment/base station 510/505 directs operations (e.g., control, adjustment, management, etc.) of the user equipment/base station 510/505. The processor 555/580 may be connected to the memory unit 560/585 configured to store program codes and data. The memory 560/585 is connected to the processor 555/580 to store operating systems, applications and general files.

The processor 555/580 may be called one of a controller, a microcontroller, a microprocessor, a microcomputer and the like. And, the processor 555/580 may be implemented using hardware, firmware, software and/or any combinations thereof. In the implementation by hardware, the processor 555/580 may be provided with one of ASICs (application specific integrated circuits), DSPs (digital signal processors), DSPDs (digital signal processing devices), PLDs (programmable logic devices), FPGAs (field programmable gate arrays), and the like. In case of the implementation by firmware or software, firmware or software can be configured to include modules, procedures, and/or functions for performing the above-explained functions or operations of the present invention. And, the firmware or software configured to implement the present invention is loaded in the processor 555/580 or saved in the memory 560/585 to be driven by the processor 555/580.

Layers of a radio protocol between a user equipment and a base station may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A user equipment and a base station may be able to exchange RRC messages with each other via radio communication layer and RRC layers.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

INDUSTRIAL APPLICABILITY

Accordingly, an apparatus for transmitting and receiving CoMP reference signal are applicable to such a mobile communication system as 3GPP LTE, 3GPP LTE-A, IEEE 802 and the like.

What is claimed:

1. A method of transmitting a reference signal by a base station (BS) in a wireless communication system, the method comprising:
    generating a reference signal sequence using either one of a cell identifier of the base station and a predetermined identifier, the predetermined identifier being different from the cell identifier of the base station; and
    transmitting the generated reference signal sequence to a user equipment (UE),
    wherein the predetermined identifier that is different from the cell identifier is used for generating the reference signal sequence when a coordinated multi-point (CoMP) mode is configured for the UE, and
    wherein the cell identifier is used for generating the reference signal sequence when the CoMP mode is not configured for the UE.

2. The method of claim 1, further comprising:
    mapping the generated reference signal sequence to a resource region using either one of the cell identifier and the predetermined identifier.

3. The method of claim 1, wherein the predetermined identifier is a CoMP set ID shared by a plurality of cells operating in the CoMP mode for the UE.

4. The method of claim 1, further comprising:
transmitting the predetermined identifier via higher layer signaling only when the CoMP mode has been configured for the UE.

5. The method of claim 2,
wherein a location of the resource region where the reference signal sequence is mapped is the same for a plurality of cells operating in the CoMP mode for the UE, regardless of whether frequency shift values computed based on individual cell IDs of the plurality of cells are different from each other.

6. The method of claim 1, further comprising:
selecting one of the cell identifier and the predetermined identifier for generating the reference signal sequence based on whether the CoMP mode has been configured for the UE or not.

7. The method of claim 1, wherein the reference signal sequence is a UE-specific reference signal sequence or a demodulation reference signal sequence.

8. The method of claim 1, further comprising:
transmitting control information to the UE through a physical downlink control channel (PDCCH) using a downlink control information (DCI) format dedicated to the CoMP mode.

9. The method of claim 1, further comprising:
receiving indication information on the CoMP mode configured for the UE.

10. A method of receiving a reference signal at a user equipment (UE) in a wireless communication system, the method comprising:
receiving a predetermined identifier to be used in a coordinated multi-point (CoMP) mode via higher layer signaling from a base station, the predetermined identifier being different from a cell identifier of the base station; and
receiving a reference signal from the base station,
wherein the reference signal is generated using the predetermined identifier that is different from the cell identifier when the CoMP mode is configured for the UE, and
wherein the reference signal is generated using the cell identifier when the CoMP mode is not configured for the UE.

11. The method of claim 10, further comprising:
receiving control information for the CoMP mode from the base station through a physical downlink control channel (PDCCH) using a downlink control information (DCI) format dedicated to the CoMP mode.

12. The method of claim 10, wherein the reference signal is a UE-specific reference signal or a demodulation reference signal.

13. The method of claim 10, further comprising:
receiving the cell identifier of the base station via a primary synchronization channel (P-SCH) and a secondary synchronization channel (S-SCH).

14. A non-transitory computer readable medium having recorded thereon a computer readable program to perform the method of claim 1.

15. A base station (BS) apparatus transmitting a reference signal in a wireless communication system, the BS apparatus comprising:
a processor generating a reference signal sequence using either one of a cell identifier of the base station and a predetermined identifier, the predetermined identifier being different from the cell identifier of the base station; and
a transmitter transmitting the generated reference signal sequence to a user equipment (UE),
wherein the predetermined identifier that is different from the cell identifier is used for generating the reference signal sequence when a coordinated multi-point (CoMP) mode is configured for the UE, and
wherein the cell identifier is used for generating the reference signal sequence when the CoMP mode is not configured for the UE.

16. A user equipment (UE) apparatus receiving a reference signal in a wireless communication system, the UE apparatus comprising:
a receiver receiving a radio frequency signal from a base station; and
a processer controlling the receiver,
wherein the processor controls the receiver to receive a predetermined identifier to be used in a coordinated multi-point (CoMP) mode via higher layer signaling from the base station and to receive a reference signal sequence from the base station, the predetermined identifier being different from a cell identifier of the base station,
wherein the reference signal is generated using the predetermined identifier that is different from the cell identifier when the CoMP mode is configured for the UE, and
wherein the reference signal is generated using the cell identifier when the CoMP mode is not configured for the UE.

* * * * *